(12) United States Patent
Suzuki

(10) Patent No.: US 10,965,226 B2
(45) Date of Patent: Mar. 30, 2021

(54) POWER CONVERSION APPARATUS AND POWER CONVERSION SYSTEM

(71) Applicant: TOSHIBA MITSUBISHI-ELECTRIC INDUSTRIAL SYSTEMS CORPORATION, Chuo-ku (JP)

(72) Inventor: Hiromitsu Suzuki, Tokyo (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 0 days.

(21) Appl. No.: 16/663,591

(22) Filed: Oct. 25, 2019

(65) Prior Publication Data

US 2020/0059171 A1 Feb. 20, 2020

Related U.S. Application Data

(63) Continuation of application No. PCT/JP2017/016356, filed on Apr. 25, 2017.

(51) Int. Cl.
*H02P 3/18* (2006.01)

(52) U.S. Cl.
CPC .................................. *H02P 3/18* (2013.01)

(58) Field of Classification Search
CPC .................................. H02P 3/18; H02P 8/36
USPC .................................. 318/367, 563, 400.21
See application file for complete search history.

(56) References Cited

U.S. PATENT DOCUMENTS

| | | | |
|---|---|---|---|
| 5,574,346 A * | 11/1996 | Chavan | G01R 31/34 318/434 |
| 6,034,449 A * | 3/2000 | Sakai | H01H 47/005 307/139 |
| 6,484,076 B2 * | 11/2002 | Hwang | B60L 3/04 701/23 |
| 6,845,022 B2 | 1/2005 | Yoshimura et al. | |
| 10,040,440 B2 * | 8/2018 | Iwagami | B60W 10/10 |

(Continued)

FOREIGN PATENT DOCUMENTS

| | | |
|---|---|---|
| JP | 2004-312817 A | 11/2004 |
| JP | 2007-306758 A | 11/2007 |
| JP | 2012-039835 A | 2/2012 |

(Continued)

OTHER PUBLICATIONS

International Search Report dated Jun. 20, 2017 in PCT/JP2017/016356 filed on Apr. 25, 2017.

*Primary Examiner* — Jorge L Carrasquillo

(74) *Attorney, Agent, or Firm* — Oblon, McClelland, Maier & Neustadt, L.L.P.

(57) ABSTRACT

A power conversion apparatus and a power conversion system that ensure safety capable of reliably performing an emergency stop and have a failure monitoring function are provided. The command signal for emergency stop of the power conversion apparatus between the supervisory monitoring and control device and the power conversion apparatus is to be a dual system, and the supervisory monitoring and control device monitors a performance of emergency stop of the power conversion apparatus by delaying the start of operation for a predetermined time from the operation command signal output. The supervisory monitoring and control device check a soundness of the power conversion apparatus by generating a test operation signal during that delay period.

6 Claims, 7 Drawing Sheets

(56) References Cited

U.S. PATENT DOCUMENTS

2004/0196678 A1    10/2004   Yoshimura et al.

FOREIGN PATENT DOCUMENTS

| WO | WO 2008/132975 A1 | 11/2008 | | |
|---|---|---|---|---|
| WO | WO 2015/136699 A1 | 9/2015 | | |
| WO | WO-2015136699 A1 * | 9/2015 | ........ | H02M 7/53875 |
| WO | WO-2018198191 A1 * | 11/2018 | ............ | H02P 29/024 |

* cited by examiner

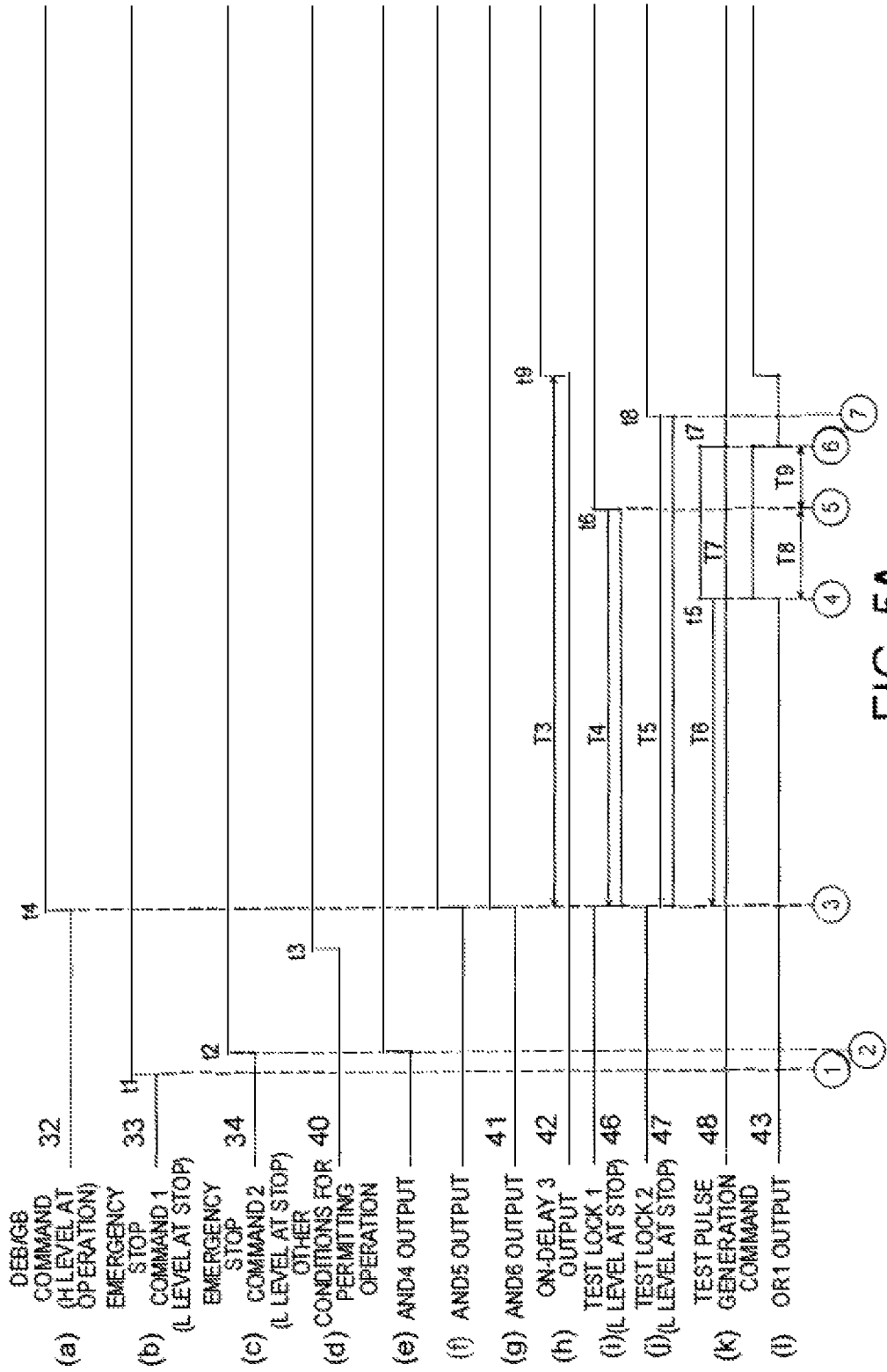

POWER CONVERSION APPARATUS AND POWER CONVERSION SYSTEM

CROSS-REFERENCE TO RELATED APPLICATION

This application is based upon and claims the benefit of priority from the prior PCT Patent Application No. PCT/JP2017/16356, filed on Apr. 25, 2017, the entire contents of which are incorporated herein by reference.

TECHNICAL FIELD

The embodiment of the present invention relates to a power conversion apparatus and a power conversion system.

BACKGROUND ART

In order to stop operation of a power converter reliably, a reliability of an emergency stop circuit becomes an issue. Although it is necessary to make a self-diagnosis that confirms the emergency stop circuit is not broken, if the diagnosis circuit becomes complicated, there is a problem that the reliability of the entire apparatus is impaired on the contrary.

In a drive apparatus that is the power conversion apparatus for drive a motor, about a safety stop circuit interposed between a gate drive circuit that drives an inverter unit and a PWM generation circuit for generating a PWM (Pulse Width Modulation) signal to be supplied to the gate drive circuit, a technique for interrupting the PWM signal to the gate drive circuit is disclosed. A circuit using this technique is composed of a power cut-off terminal and a PWM signal cut-off circuit that shuts off any of the PWM signals in conjunction with the external power cut-off terminal, and the PWM signal cut-off circuit is cut when the external power cut-off terminal is open. (see Patent Document 1).

PRIOR ART DOCUMENT

Patent Document

Patent document 1: International Patent Publication No. WO2008-132975

SUMMARY OF THE INVENTION

Problem to be Solved by the Invention

However, the invention described in Patent Document 1 normally functions when the safety stop circuit (or the emergency stop circuit) is sound, but when the reliability of soundness is not obtained, there exists a problem of possibility that it could not be stopped safely.

The present invention has been made in order to solve the above-described problems. An object is to provide a power conversion apparatus and a power conversion system capable of reliably performing an emergency stop by following performance. That is, the command signal for emergency stop of the drive apparatus between the supervisory monitoring and control device and the drive apparatus is to be a dual system, and the supervisory monitoring and control device monitors a performance of emergency stop of the drive apparatus by delaying the start of operation for a predetermined time from the operation command signal output.

Means for Solving the Problem

In order to achieve the above object, the a power conversion system according to the present invention is configured to have a power conversion apparatus that receives power supply to drive a motor, and a supervisory monitoring and control device that is communicably connected to the power conversion apparatus, the power conversion apparatus comprises a main circuit having a power conversion unit for supplying AC power to the motor, a control circuit that transmits a PWM signal for driving on/off semiconductor elements that constitutes the power conversion unit of the main circuit, and the supervisory monitoring and control device that generates at least, an operation command signal to be transmitted to the control circuit for operating/stopping the motor, a first emergency stop command signal transmitted to the control circuit to perform an emergency stop of the motor, the control circuit includes a circuit for generating the PWM signal, a gate pulse transmitting circuit for transmitting the PWM signal to the main circuit, an emergency stop circuit for stopping transmission of the PWM signal to the main circuit when receiving either the first emergency stop command signal or the second emergency stop command signal, a monitoring circuit for confirming the operation of the emergency stop circuit, wherein, the control circuit generates the PWM signal delayed by a predetermined first delay period, in a state where neither the first emergency stop command signal nor the second emergency stop command signal is received from the supervisory monitoring and control device, and when an operation command signal is received from the supervisory monitoring and control device, a first test operation signal in the first delay period, the first test operation signal is a forced operation signal of the first emergency stop command signal, and generates a second test operation signal that is a forced operation signal of the second emergency stop command signal, in the first delay period.

Effects of the Invention

According to the present invention, it is possible to provide a power conversion apparatus and a power conversion system capable of surely performing an emergency stop, by making a dual system of emergency stop command signal for causing the drive apparatus to perform an emergency stop between the supervisory monitoring and control device and the drive apparatus, and by delaying predetermined time period to start operation when a start command is outputted from the supervisory monitoring and control device, and checking the emergency stop circuit in the drive apparatus by the monitoring circuit.

BRIEF DESCRIPTION OF THE DRAWINGS

FIGS. 5A and 5B A timing chart for explaining functions and operations of the control circuit and a test signal generation and monitoring unit shown in FIG. 3.

EMBODIMENT TO PRACTICE THE INVENTION

Hereinafter, embodiment of the present invention will be described with reference to the drawings.

Embodiment 1

Figure 1:
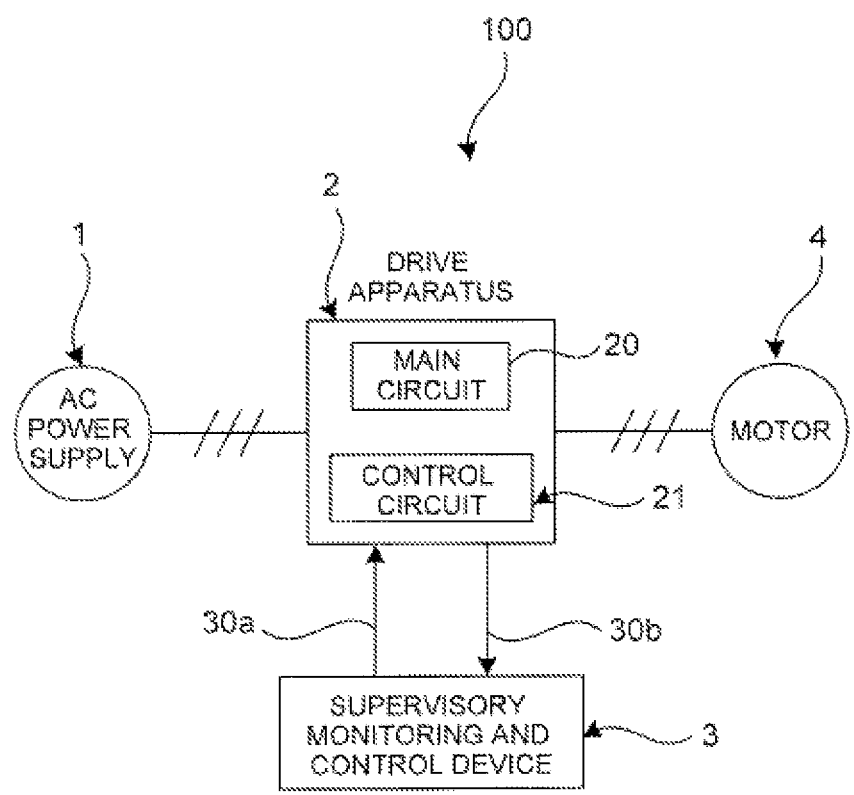
FIG. 1 A schematic configuration diagram of a power conversion system using a power conversion apparatus (drive apparatus) according to a first embodiment.

Here, the power conversion apparatus may be referred to as a drive apparatus. FIG. 1 is a schematic configuration diagram of a power conversion system 100 using a power conversion apparatus (drive apparatus) 2 according to the first embodiment. The power conversion system 100 has a drive apparatus 2 for receiving the supply of a three-phase AC power supply 1 (hereinafter referred to as an alternating current power supply if not particularly necessary) to drive the motor 4, and a supervisory monitoring and control device 3.

The AC power supply 1 supplies AC power to the drive apparatus 2.

The drive apparatus 2 is configured to have a main circuit 20 and a control circuit 21, is connected to the AC power supply 1 and the motor 4, receives an AC power from the AC power supply 1, and drives the motor 4 by generating an electric power suitable for drive the motor 4.

The main circuit 20 includes a power converter (not shown) that converts alternating current power into alternating current power necessary to drive the motor 4. Although the main circuit 20 has a converter which converts alternating current power into direct current power, and an inverter which converts direct current power into alternating current power, etc., since it is not the intension of the present invention, the explanation is omitted here.

The supervisory monitoring and control device 3 is communicably connected to the drive apparatus 2 and includes an emergency stop command 1 signal and an emergency stop command 2 signal for ensuring the reliability of the emergency stop circuit of the drive apparatus 2, so it makes a double emergency system. Further, when the emergency stop command signal is transmitted to the drive apparatus 2, the supervisory monitoring and control device 3 confirms that answer signals as the response signal from the drive apparatus 2 responds in synchronization. A code 30a is an emergency stop command signal (in particular, it may be referred to as an emergency stop command if it is not necessary to distinguish the signal), and a code 30b is an answer signal (when it is not necessary to distinguish that, it may be called an answer, but it is same meanings). Note that there are a plurality of emergency stop commands and answers, the details of which will be described later.

Figure 2:
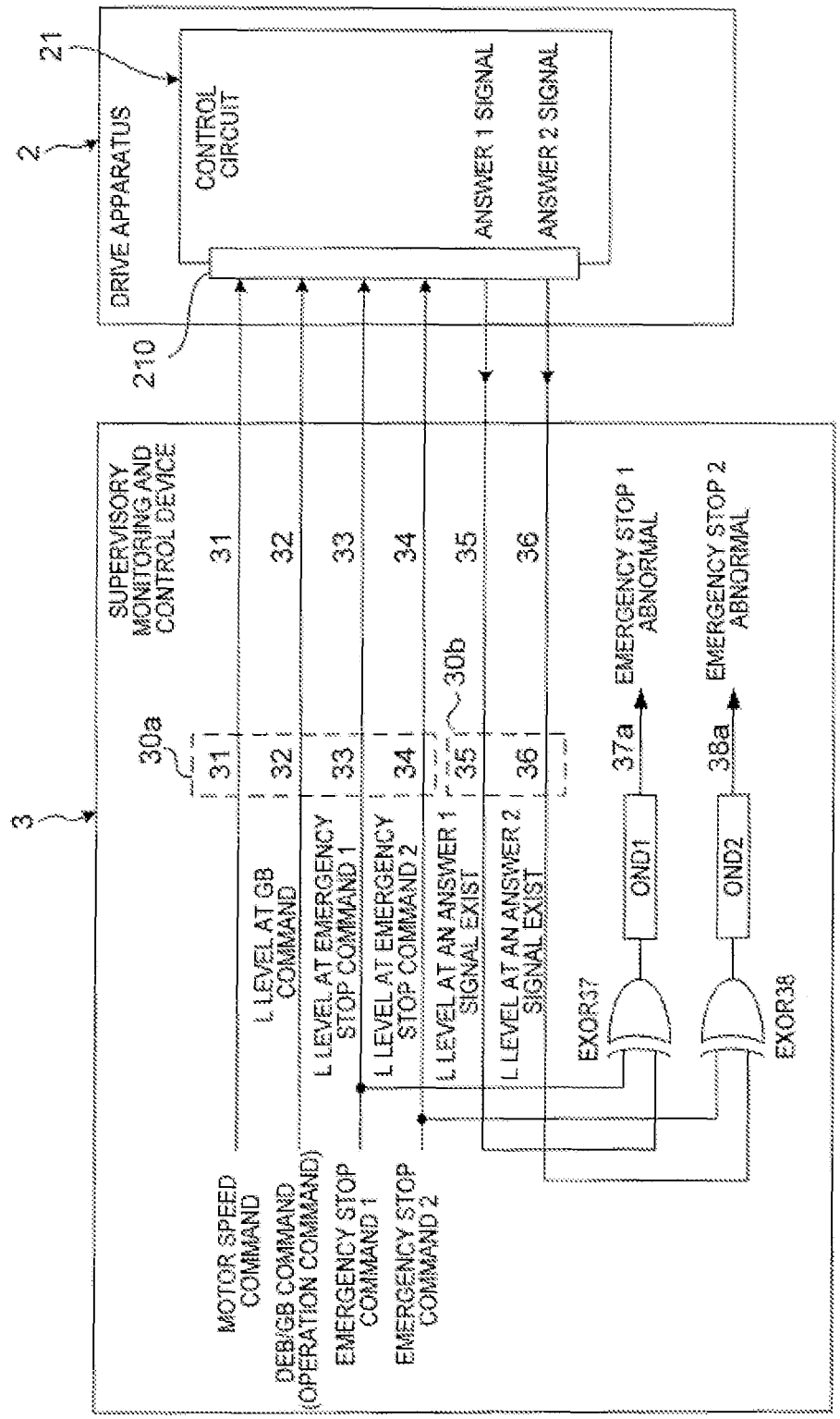
FIG. 2 A block diagram showing the flow of signals between a supervisory monitoring and control device and a drive apparatus that constitute the power conversion system shown in FIG. 1.

FIG. 2 is a block diagram showing the signal flow between the supervisory monitoring and control device 3 and the drive apparatus 2 that constitute the power conversion system 100 shown in FIG. 1.

The supervisory monitoring and control device 3 is provided with an instruction to drive and control the drive apparatus 2 and abnormality notification means when an abnormality in the drive apparatus 2 is detected.

As command signals for driving and controlling the drive apparatus 2 described above, a motor speed command signal 31, the DEB/GB command signal 32, the emergency stop command 1 signal (first emergency stop signal) 33, and the emergency stop command 2 signal (second emergency stop signal) 34 are provided.

The motor speed command signal 31 is a command for setting the speed reference of the motor 4, and is outputted to the control circuit 21 of the drive apparatus 2.

The DEB/GB command signal 32 is a so-called operation command signal, and is outputted from the supervisory monitoring and control device 3 to the control circuit 21 of the drive apparatus 2.

The DEB command means that the gate block is released, and the command is to permit the switching operation of switching elements (not shown) that configures the drive apparatus 2.

The GB command is a command that blocks (prohibits) the switching operation of the switching elements. That is, here, DEB and GB are two sides. Here, an H (high) level is transmitted as an operation command to the drive apparatus 2, and an L (Low) level is transmitted as a stop command.

The emergency stop command 1 signal 33 is a command for emergency stop of the drive apparatus 2, and is outputted from the supervisory monitoring and control device 3 to the control circuit 21 of the drive apparatus 2.

The emergency stop command 1 signal 33 is generated when an external emergency stop button (not shown) is pressed, or when the emergency stop command signal is generated in a sequence due to protection interlocking or the like. Then the emergency stop command 1 signal 33 is transmitted. Here, the L level signal is transmitted when the emergency stop command 1 signal is generated.

The emergency stop command 2 signal 34 is provided for a double system of a command signal for stopping the drive apparatus 2 as described in the above-mentioned "Problem to be solved by the invention", and is outputted from the supervisory monitoring and control 3 to the control circuit 21 of the drive apparatus 2.

The emergency stop command 2 signal 34 has the same function as the emergency stop command 1 signal 33. L level signal is transmitted at the time of emergency stop command 2 signal 34 generation.

The answer 1 signal 35 is a signal transmitted from the control circuit unit 21 to the supervisory monitoring and control device 3 and is a response signal of the emergency stop command 1 signal 33.

The answer 2 signal 36 is a signal transmitted from the control circuit unit 21 to the supervisory monitoring and control device 3 and is a response signal of the emergency stop command 2 signal 34.

An emergency stop 1 abnormal 37a is a signal obtained by calculating an exclusive or EXOR37 of the emergency stop command 1 signal 33 and the answer 1 signal 35, and this signal is obtained by delaying time period T1 by an on-delay OND1 from the timing of turning point when the input signal changes from L level to H level. (Hereinafter, the exclusive or EXOR37 is simply referred to as EXOR37, and the on-delay OND1 is simply referred to as OND1.) When the emergency stop command 1 signal 33 is transmitted to the control circuit 21 of the drive apparatus 2 and the answer 1 signal 35 is outputted from the control circuit 21, the output signal of the EXOR37 becomes L level and it is determined that the state is normal. However, when some abnormality occurs in the control circuit 21 and the answer 1 signal 35 is not outputted, the output signal of the EXOR37 becomes H level and the emergency stop 1 abnormal 37a is outputted (notified) from OND1. Note that the on-delay is delayed for a predetermined time period when the input changes from L level to H level, but there is no output delay when the input changes from H level to L level.

The emergency stop 2 abnormal 38a is a signal that calculates exclusive or EXOR38 of the emergency stop command 2 signal 34 and the answer 2 signal 36 based on the emergency stop command 2 signal 34 provided for the double system of the command signal. And the signal is obtained by delaying the obtained output signal by an on-delay OND2. (Hereinafter, the exclusive or EXOR38 is simply referred to as EXOR38, and the on-delay OND2 is simply referred to as OND2.) When the emergency stop command 2 signal 34 is outputted to the control circuit 21 of the drive apparatus 2 and the answer 2 signal 36 is outputted from the control circuit 21, the output signal of the EXOR38 becomes L level, and it is determined that the state is normal. However, when some abnormality occurs in the control circuit 21 and the answer 2 signal 36 is not outputted, the output signal of the EXOR38 becomes H level, and the emergency stop 2 abnormality 38a is outputted.

The on-delay delay time T1 of OND1 and OND2 is a value taking into consideration the processing delay of the circuit and the signal transfer time, and is a delay of about several hundred milliseconds. Further, when the emergency stop 1 abnormality 37a or the emergency stop 2 abnormality 38a is established, the supervisory monitoring and control device 3 performs the necessary protection interlocking process, but the description thereof will be omitted.

Figure 3:
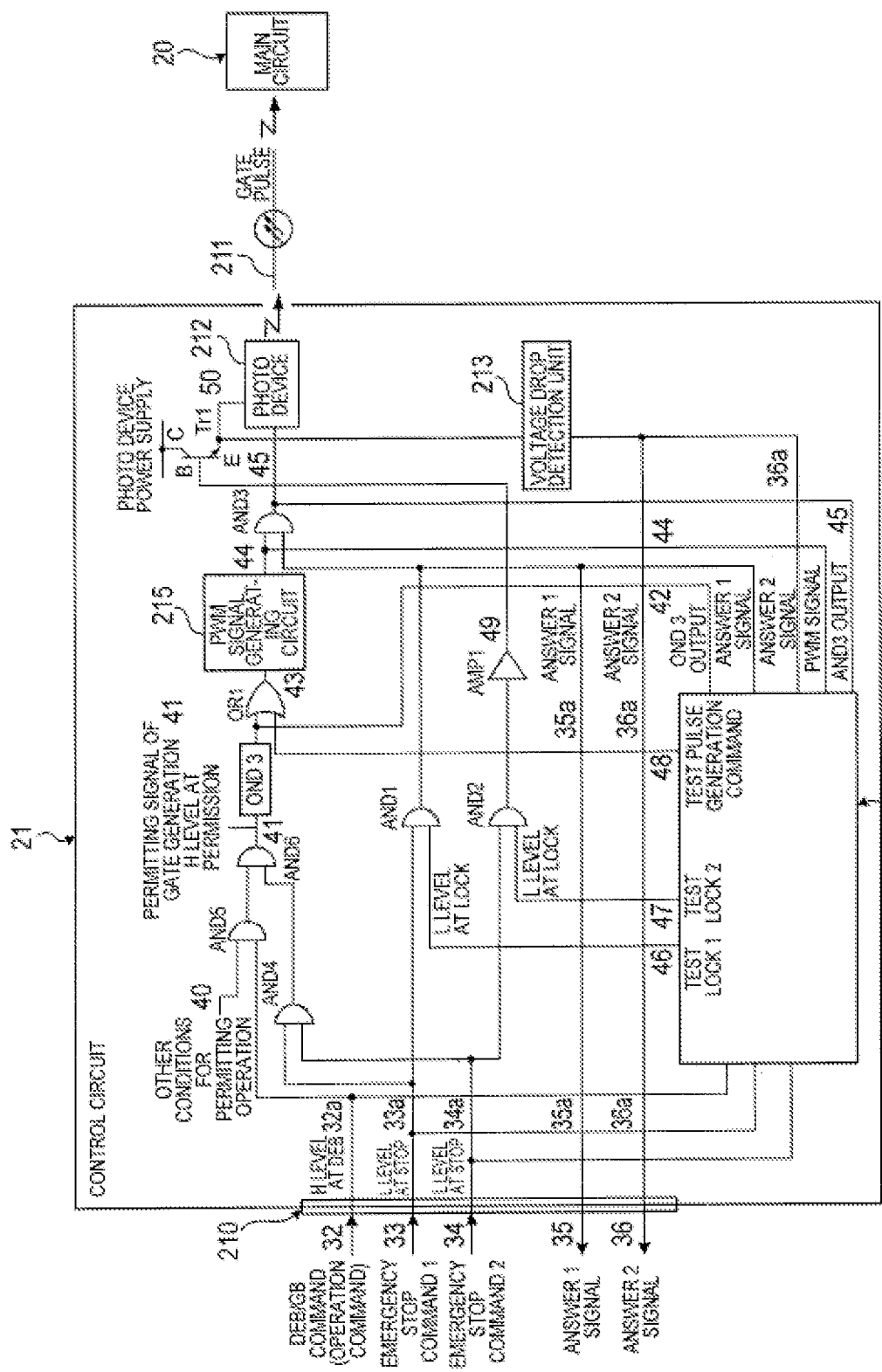
FIG. 3 A circuit diagram for explaining the function and operation of a portion according to an embodiment of a control circuit constituting the drive apparatus shown in FIG. 2.
Figure 5B:
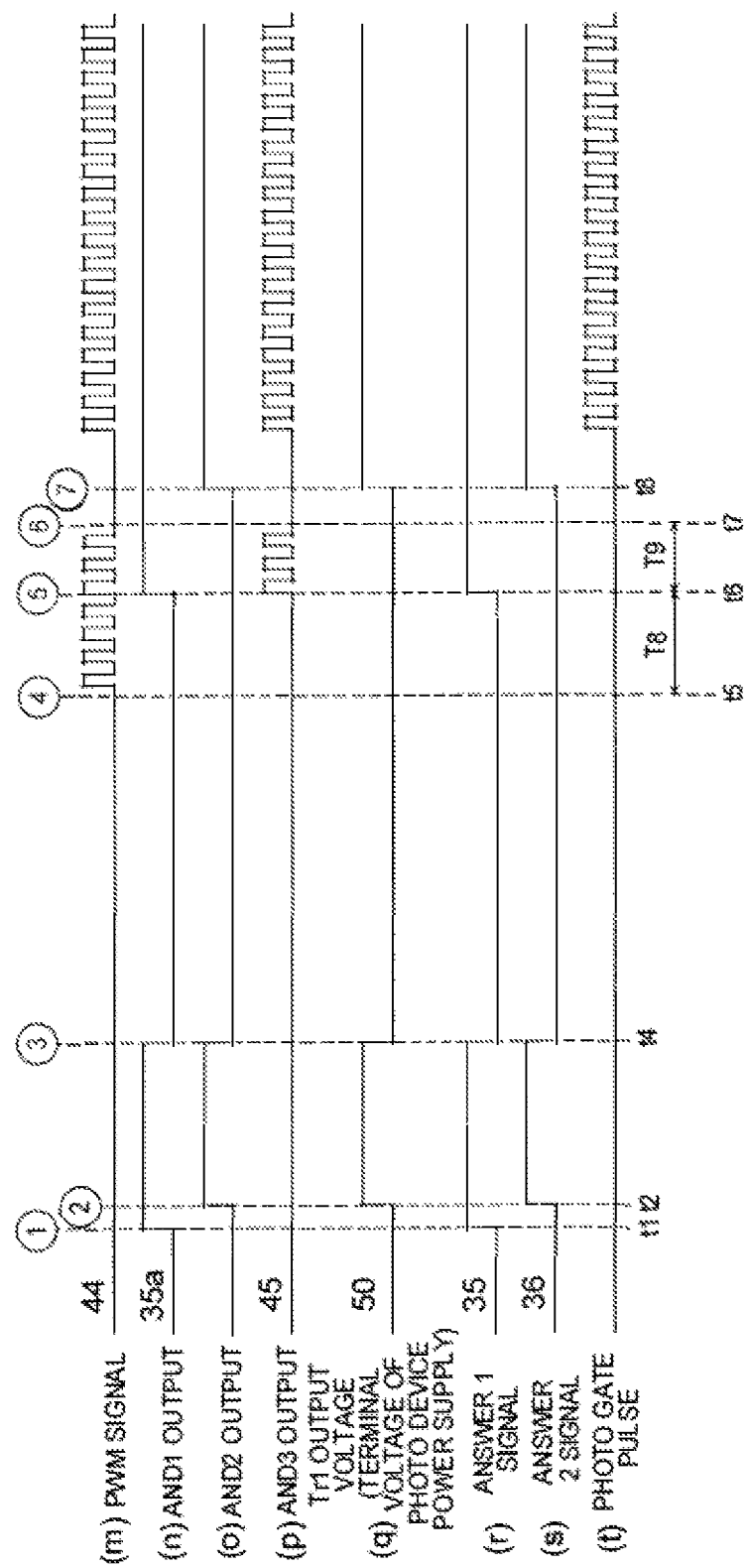

FIG. 3 is a circuit diagram for explaining the function and operation of a portion according to the embodiment of the control circuit 21 constituting the drive apparatus 2 shown in FIG. 2. FIGS. 5A and 5B are a timing chart for explaining the functions and operations of the control circuit 21 and the test signal generation and monitoring circuit unit shown in FIG. 3. Hereinafter, description will be made with reference to these figures.

The control circuit 21 is connected to the supervisory monitoring and control device 3 via the interface unit 210. The control circuit 21 transmits gate pulses by optical communication to the main circuit 20 through a optical communication cable 211. Although the optical communication cable 211 is used here, a gate pulse may be transmitted from the control circuit 21 to the main circuit unit 20 using a photo-coupler.

In the interface unit 210 communicated with the supervisory monitoring and control device 3, the DEV/GB command 32, emergency stop command 1 signal 33, emergency stop command 2 signal 34, answer 1 signal 35 and answer 2 signal 36 etc. are includes as described in the supervisory monitoring and control device 3 shown in FIG. 2.

The DEB/GB command 32, the emergency stop command 1 signal 33, and the emergency stop command 2 signal 34 transmitted from the supervisory monitoring and control device 3 are converted into appropriate signal levels by the interface unit 210, and a DEB/GB command 32a and an emergency stop command 1 signal 33a and an emergency stop command 2 signal 34a are respectively obtained.

The emergency stop command 1 signal 33a and the emergency stop command 2 signal 34a are inputted to the logical product AND4 (hereinafter, the logical product AND4 is simply referred to as AND4).

The DEB/GB command 32a is inputted to the test signal generation and monitoring unit 214 and a logical product AND5. (Hereinafter, the logical product AND5 is simply referred to as AND5.) The emergency stop command 1 signal 33a is inputted to the test signal generation and monitoring unit 214 and a logical product AND1 (hereinafter, the logical product AND1 is simply referred to as AND1.).

Test lock 1 signal 46 is inputted from the test signal generation and monitoring unit 214 to the other of AND1. The test lock 1 signal 46 corresponds to a forced operation signal of the emergency stop command 1 signal 33a.

The emergency stop command 2 signal 34a is inputted to the test signal generation and monitoring unit 214 and a logical product AND2 (hereinafter, the logical product 2 is simply referred to as AND2).

Test lock 2 signal 47 is inputted from the test signal generation and monitoring unit 214 to the other of AND2. The test lock 2 signal 47 corresponds to the forced operation signal of the emergency stop command 2 signal 34a.

Other conditions for permitting operation signal 40 from a circuit (not shown) is inputted to the other input terminal of AND5.

The other conditions for permitting operation are, for example, a state signal of the cooling device, a state of the AC power supply 1, and the like, and when the operation permission is established, the other conditions for permitting operation signal 40 becomes H level.

The output of AND4 and the output of AND5 are inputted to a logical product AND6 (hereinafter, the logical product AND6 is simply referred to as AND6).

A gate generation permission signal 41, which is the output of AND6, is inputted to an on-delay OND3 (hereinafter, the on-delay OND3 is simply referred to as OND3).

OND3 is an on-delay when the input signal is changed from L level to H level, and the output signal is delayed by a predetermined time T3.

The output signal 42 of the OND3 is inputted to the logical sum OR1 and also to the test signal generation and monitoring unit 214. A test pulse generation command signal 48 is inputted from the test signal generation and monitoring unit 214 to the other input of the logical sum OR1.

The output signal 44 of the logical sum OR1 is inputted to the PWM signal generation circuit 215.

When the output signal 44 of the logical sum OR1 becomes H level, the PWM signal generation circuit 215 generate a PWM signal 44 for switching the semiconductor elements of the main circuit 20 in accordance with a motor speed command, an output current feedback signal of the drive apparatus 2, and the like (not shown).

The answer 1 signal 35a, which is the output of AND1, is inputted to the logical product AND3 and the test signal generation and monitoring unit 214 (hereinafter, the logical product AND3 is simply referred to as AND3). Further, an answer 1 signal 35a which is an output of AND1 is inputted to the interface unit 210, converted into an appropriate signal level, and outputted as an answer 1 signal 35 to the supervisory monitoring and control device 3.

The PWM signal 44 that is the output of the PWM signal generation circuit 215 is inputted to the AND3, and the output 45 of the AND3 is connected to the photo device 212 and the test signal generation and monitoring unit 214.

Further, the PWM signal 44 that is the output of the PWM signal generation circuit 215 is connected to the test signal generation and monitoring unit 214.

The power source of the photo device 212 is connected from the photo device power source to the emitter of the transistor Tr1, and further connected to the power supply terminal of the photo device 212 via the collector of Tr1. The output of the AND2 is connected to the base of the transistor Tr1 through the amplifier AMP1 (hereinafter, the amplifier AMP1 is simply referred to as AMP1.

When power is supplied to the photo device 212, the output 45 of the AND5 is converted into an optical signal by the photo device 212 and transmitted to the main circuit 20 as a gate pulse through the optical communication cable 211.

A collector of the transistor Tr1 is connected to the power supply terminal of the photo device 212 and to a voltage drop detection unit 213. The output of the voltage drop detection unit 213 is inputted to the test signal generation and monitoring unit 214 as an answer 2 signal 36a and also inputted to the interface unit 210, and is outputted to the supervisory monitoring and control device 3 as an answer 2 signal 36 after being converted to an appropriate signal level.

(Start-Up Operation)

The operation in the start-up state refers to the operation where the emergency stop state has been canceled and the operation has returned from the operation stop state to the state (1) below.

(1) The DEB/GB command signal is in the DEB state (H level), and the emergency stop command 1 signal 33 and the emergency stop command 2 signal 34 are not in the state where the emergency stop command is outputted (H level), and, other conditions for permitting operation signal is operation permission state (H level). That is, the emergency stop command 1 signal 33 changes from L level to H level (FIG. 5A timing t1), and the emergency stop command 2 signal 34 changes from L level to H level (FIG. 5A timing t2), and other conditions for permitting operation signals change from L level to H level (FIG. 5A timing t3), and the DEB/GB command signal is in the DEB state (FIG. 5A timing t4).

In this case, the gate generation permission signal 41 outputted from AND4, AND5, and AND6 is in a permission state (H level).

The output signal of AND6 is inputted to the OND3.

The OND3 delays the input signal for a set predetermined time (hereinafter referred to as a delay time) when the input signal changes from L level to H level. In this case, the output signal 41 of the OND3 is maintained at L level during the delay time T3 for the signal (L level) inputted from the AND6, and becomes H level after the delay time has elapsed. The output signal of the OND3 is inputted to one terminal of the OR1.

The output signal of logical sum OR1 is inputted to a PWM signal generating circuit 215.

The PWM signal generating circuit 215 does not output the PWM signal while the inputted output signal of the logical add OR1 is at L level, and outputs the PWM signal when it becomes H level after the predetermined delay time T6 (FIG. 5B timing t9), (FIG. 5B) (m)).

An output signal 44 of the PWM signal generating circuit 215 is inputted to one input terminal of the AND3, and an output signal 35a of the AND1 is inputted to the other input terminal of the AND3.

Here, since the output signal 35a of AND1 is at H level (t6 in FIG. 5B (n)), the PWM signal 44 inputted to one input terminal of AND3 is outputted from the output terminal of AND3.

The output signal of AND2 is inputted to the AMP1. The output signal of AMP1 is inputted to the base of the transistor Tr1, and turns on/off the transistor Tr1. Here, since the output signal of AND2 is at H level (t8 in FIG. 5B (o)), the transistor Tr1 is turned on, and the photo device power supply connected to the collector C of the transistor Tr1 supplies a power to the photo device 212.

The photo device 212 is a communication device for converting the output signal 45 of the AND3 into an optical signal and performing optical communication, and an output optical signal of the photo device 212 is transmitted to the main circuit 20 via an optical communication cable 211. In the present embodiment, optical signal is used for communication between the control circuit 21 and the main circuit 20. However, according to the present invention, it is not limited to this communication, but any communication means between the control circuit 21 and the main circuit 20 can be acceptable.

In normal operation, the output signal 35a of the AND1 (FIG. 5B (n)), H level is maintained ((i) and (n) of FIG. 5B) except for a period when the test lock 1 signal 46 (first test lock signal) inputted to the other terminal of the AND1 is in the locked state (L level), that is the period from the timing t4 to the timing t6 of FIG. 5B, because the emergency stop command 1 signal 33a inputted to one terminal of the AND1 is not in the state where the emergency stop command is outputted (H level). The operation when the test lock 1 signal 46 is in the lock state (L level) will be described later.

The output signal 35a of the AND1 is transmitted to the supervisory monitoring and control device 3 via the interface unit 210 as an answer 1 signal 35, and is inputted to the test signal generation and monitoring circuit 214.

The output signal of AND2 (FIG. 5B (o)) is inputted to the base B of the transistor Tr1 via the AMP1, and the transistor Tr1 is turned on, and the photo device power supply supplies a power to a power terminal of the photo device 212. The voltage of the power terminal of the photo device 212 is detected by the voltage drop detection unit 213, and a voltage drop is detected if the voltage does not reach the set value. The voltage drop detection unit 213 outputs H level when the voltage at the power terminal of the photo device 212 is equal to or higher than a set value, and outputs L level when the voltage is not less than the set value.

The output signal 36a of the voltage drop detection unit 213 is maintained at H level except a period when the test lock 2 signal 47 inputted to the other terminal of the AND2 is at a lock state, that is the period T5 from timing t4 to timing t8 of FIG. 5B (FIG. 5B (o), (s)). That is, when the DEB/GB command 32a, the emergency stop command 1 signal 33a, and the emergency stop command 2 signal 33b all become H level at the timing t4, the test signal generation and monitoring unit 214 sets the test lock 1 signal 46 L level during the predetermined period T4 until the timing t6.

The test signal generation and monitoring unit 214 monitors that the states of the emergency stop command 1 signal 32a and the answer 1 signal 35a coincide with each other until the timing t4, and monitors that the test lock 1 signal 46 performs an forced emergency stop operation from the timing t4 to the timing t6 in the state of the answer 1 signal 35a. Further, after timing t6, the test signal generation and monitoring unit 214 monitors whether the states of the emergency stop command 1 signal 32a and the answer 1 signal 35a match. Furthermore, when the DEB/GB command 32a, the emergency stop command 1 signal 33a, and the emergency stop command 2 signal 33b all become H level at the timing t4, the test signal generation and monitoring unit 214 sets the test lock 2 signal 47 to L level for a predetermined period T5 until the timing t8.

The test signal generation and monitoring unit 214 monitors that the states of the emergency stop command 2 signal 33a and the answer 2 signal 36a coincide with each other until timing t4, and monitors that the test lock 2 signal 47 performs an forced emergency stop from timing t4 to timing t8 in the state of the answer 2 signal 36a. Further, after timing t8, the test signal generation and monitoring unit 214 monitors whether the states of the emergency stop command 2 signal 33a and the answer 2 signal 36a match.

The test lock 1 signal 46 monitors the range until the PWM signal is inputted to the input terminal of AND3. On the other hand, the test lock 2 signal 47 monitors the range until the voltage drop is detected from its input to the base of the transistor Tr1, and the photo device power supply to the photo device 212. Therefore the lock time T5 of the test lock 2 signal 47 is set longer than the lock time T4 of the test lock 1 signal 46 although it is shorter than the time T3 of the OND3 output signal.

(Stop Operation)

The operation at the time of stop means an operation in a state where any one of the following (1) to (2) is satisfied.

(1) A state in which the DEB/GB command signal 32 outputs the GB command (L level).

(2) A state in which either or both of the emergency stop command 1 signal 33 and the emergency stop command 2 signal 34 output (L level) an emergency stop command (generic name for emergency stop command 1 and 2).

In the case of the above (1), the GB signal (L level) is inputted to one terminal of the AND5 and also inputted to the test signal generation and monitoring unit 214.

The output signal (L level) of AND5 is inputted to one terminal of AND6. The output signal (L level) of the AND6 is inputted to the OND3.

The OND3 delays the timing at which the input signal goes to H level for a predetermined time set from when the signal goes to H level. However, in an emergency, since the output signal of AND6 is L level and does not become H level until the emergency recovers, so the output of the OND3 is maintained at L level and is inputted to one input terminal of OR1.

A test pulse generation command signal is inputted from the test signal generation and monitoring unit 214 to the other input terminal of OR1. However, the test pulse generation command signal is used for start-up operation and is not outputted in an stop operation, and the L level is maintained. As a result, the output signal of OR1 is maintained at L level, and the PWM signal is not outputted from the PWM signal generation circuit 215.

In the case of (2), either or both of the emergency stop command 1 signal 33 and the emergency stop command 2 signal 34 output an emergency stop command (a generic name of the emergency stop command 1 signal and 2) (L Level). Since the output signal of OR1 is maintained at L level and the PWM signal generation circuit 215 stops its operation, no PWM signal is outputted as in (1) above.

The emergency stop command 1 signal 33 (L level) is inputted to one of the terminals of AND1, and when the test lock 1 signal 46 inputted to the other terminal is not outputted (H level), the output signal of AND1 becomes L level and is transmitted to the supervisory monitoring and control device 3 as an answer 1 signal 35.

Similarly, the emergency stop command 2 signal 34 (L level) is inputted to one terminal of AND2, and when the test lock 2 signal 47 inputted to the other terminal is not outputted (H level), the output signal of the AND2 becomes L level and is inputted to the base of the transistor Tr1 through the AMP1, the transistor Tr1 is turned off, and the photo device power supply to the photo device 212 is stopped.

As described above, the emergency stop command 1 signal 33 and the emergency stop command 2 signal 34 are provided with two emergency stop commands independently to form a double system of emergency stop commands. Even if there is some failure in the system that outputs the emergency stop command 1 signal and the emergency stop command 1 signal is not outputted, if the emergency stop command 2 signal is outputted, the PWM signal is not transmitted to the main circuit 20 via the optical communication cable 211 connected to the main circuit 20.

Figure 4A:
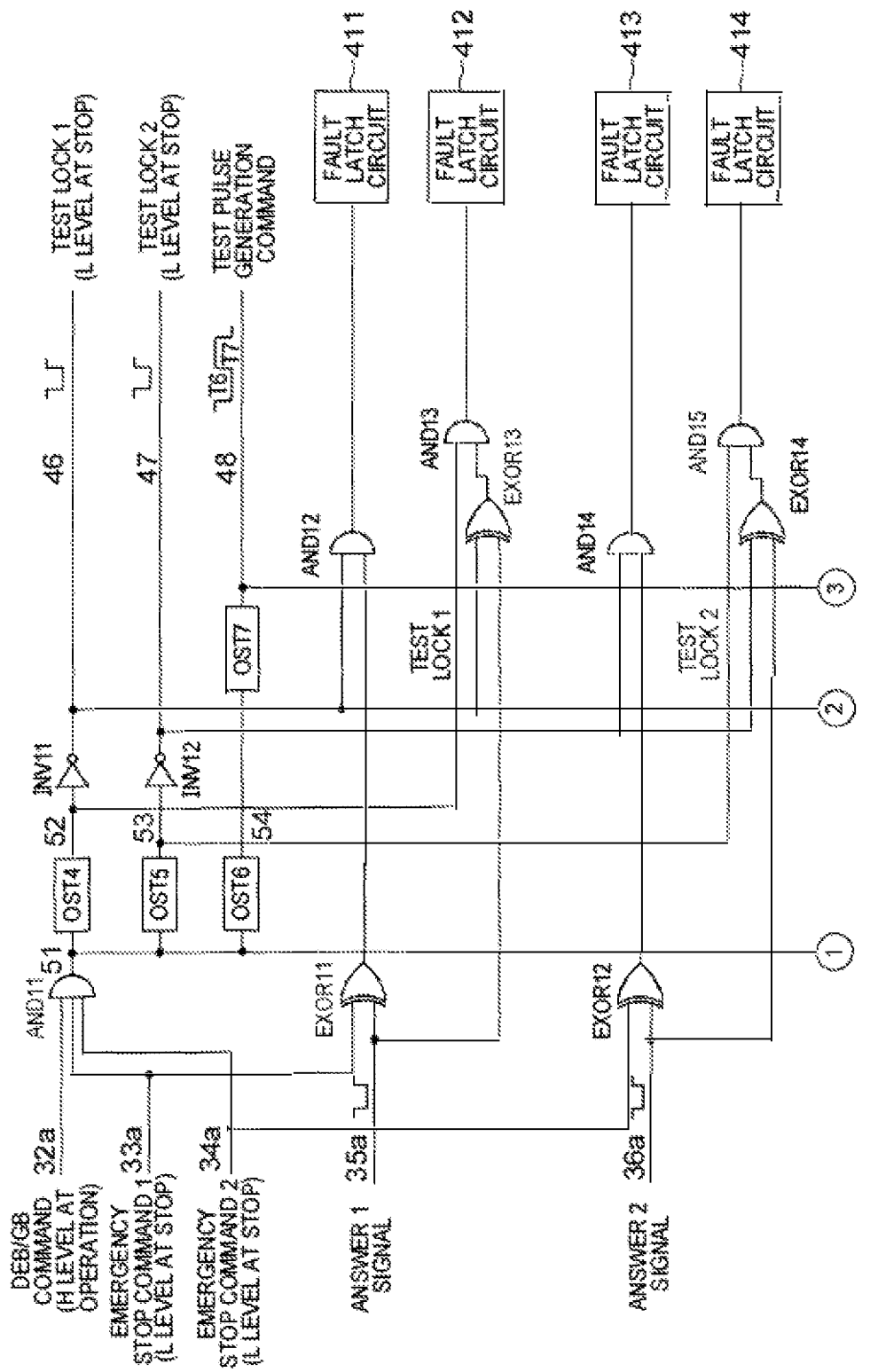
FIGS. 4A and 4B A circuit diagram for explaining the function and operation of a portion according to the embodiment of the test signal generation and monitoring circuit shown in FIG. 3.
Figure 4B:
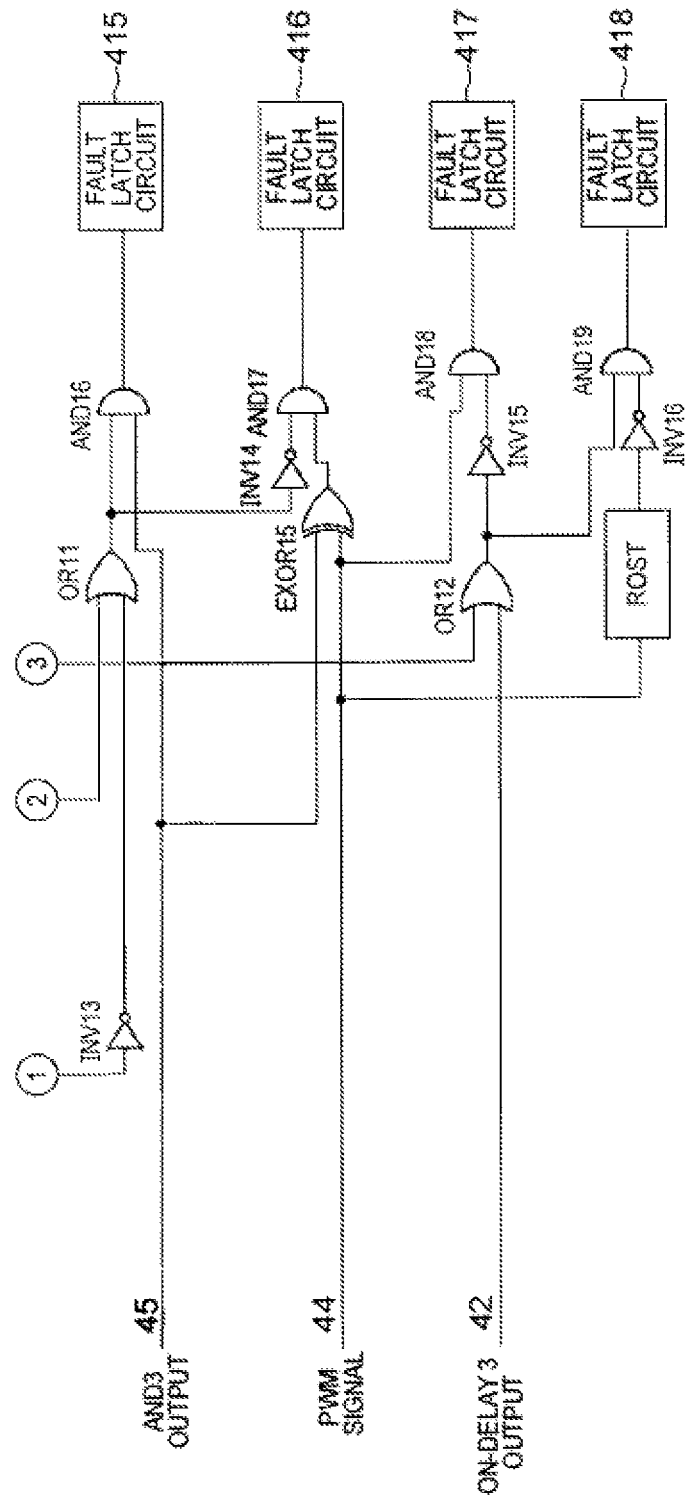

FIGS. 4A and 4B are a circuit diagram for explaining functions and operations of portions related to the embodiment of the test signal generation and monitoring unit 214 shown in FIG. 3. FIGS. 5A and 5B are a timing chart for explaining the functions and operations of the control circuit 21 and the test signal generation and monitoring unit 214 shown in FIG. 3. This will be described below with reference to these figures.

(Operation of One-Shot OST4, OST5, and OND6)

In FIG. 4A, the DEB/GB command signal 32a, the emergency stop command 1 signal 33a and the emergency stop command 2 signal 34a transmitted from the supervisory monitoring and control device 3 via interface unit 210 are inputted to the AND11. The output signal of the AND11 is inputted to the one-shot OST4, one-shot OST5, on-delay OND6, and inversion INV13 (Hereinafter, logical product AND11 is simply referred to as AND11, one-shot OST4 is simply referred to as OST4, one-shot OST5 is simply referred to as OST5, on-delay OND6 is simply referred to as OND6, and inversion INV13 is simply referred to as INV13.).

The output signal of AND11 becomes H level when the DEB/GB command signal 32a, the emergency stop command 1 signal 33a, and the emergency stop command 2 signal 34a inputted to the input terminal of the AND11 all become H level (timing t4). At this time, the output signal of the OST4 is set to the L level for a predetermined time indicated by T4 (timing t4 to t6).

The output of the OST4 is connected to the inversion INV11, and the inversion INV11 outputs an inverted signal of the input (Hereinafter, the inverted INV11 is simply referred to as INV11.). The output signal of INV11 becomes the test lock 1 signal (see FIG. 5A (i)).

When the output signal of the AND11 becomes H level, the OST5 sets the output signal to H level for a predetermined time indicated by a period T5 (timing t4 to t8). The output of the OST5 is connected to the inversion INV12 and outputs an inverted signal of the input. The output of OST5 is a test lock 2 signal 47 (FIG. 5A (j)).

The output of OND6 is connected to one-shot OST7. When the output signal of the AND11 changes from the L level to the H level, the output of the OND6 is delayed by a predetermined time T6 and becomes the H level (timing t5). When the output of the OND6 becomes H level, the one-shot OST7 sets the output signal to H level for a predetermined time indicated by a period 17 (timing t5 to t7). This signal becomes a test pulse generation command signal (FIG. 5A (k)).

(Monitoring the Signal Matching Between Emergency Stop Command 1 Signal 33a and Answer 1 Signal 35a)

As described in FIG. 3, the answer 1 signal 35a is the response signal to the emergency stop command 1 signal 33a, and the output signal of AND1 is inputted to the test signal generation and monitoring unit 214, and is also inputted to the supervisory monitoring and control device 3 via the interface unit 210 as the answer 1 signal 35.

The test signal generation and monitoring unit 214 monitors whether the answer 1 signal 35a is responding to the inputted emergency stop command 1 signal 33a. So the answer 1 signal 35a is inputted to one terminal of an EXOR11, and the emergency stop command 1 signal 33a is inputted to the other terminal of the EXOR11 (Hereinafter, the exclusive or EXOR11 is simply referred to as EXOR11.).

The output signal of EXOR11 becomes H level when the above two input signals do not match, and becomes L level when they match. The output signal of the EXOR11 is inputted to one input terminal of the logical product AND12, and the test lock 1 signal 46 is inputted to the other input terminal of a logical product AND12 (Hereinafter, the logical product AND12 is simply referred to as AND12.).

The output signal of the AND12 is inputted to the fault latch circuit 411.

In this way, a signal for monitoring the coincidence of the emergency stop command 1 signal 33*a* and the answer 1 signal 35*a* is outputted from the output terminal of the AND12. As a result of the above monitoring, if they do not match, an H level is outputted and there is a possibility of failure, so that it is regarded as a failure state and is latched (saved) by a fault latch circuit 411. In the case of coincidence, L level is outputted, and the failure state is not latched by the fault latch circuit 411. Note that the fault latch circuit 411 is related to the processing at the time of failure and, unlike the theme of the present invention, can be configured by existing technology, therefore the description thereof is omitted. The same applies to other fault latch circuits described later.

As described above, the test lock 1 signal 46 inputted to the other input terminal of the AND12 is outputted at the L level for a predetermined time period indicated by T4 (timing t4 to t6), and is outputted at the other time H level. Therefore, the matching between the emergency stop command 1 signal 33*a* and the answer 1 signal 35*a* is monitored during the time when the H level is outputted, and if it does not coincide, it is regarded as a failure state and is latched by the fault latch circuit 411.

(Monitors the Matching Between the Test Lock 1 Signal 46 and the Answer 1 Signal 35*a*)

The test lock 1 signal 46 is inputted to one terminal of an exclusive or EXOR13, the answer 1 signal 35*a* is inputted to the other terminal of the exclusive or EXOR13, and the matching between the test lock 1 signal 46 and the answer 1 signal 35*a* is monitored. (Hereinafter, the exclusive or EXOR13 is simply referred to as EXOR13.) As a result of this monitoring, if the output signals of the EXOR13 do not match, an H level is outputted and is inputted to one input terminal of a logical product AND13. (Hereinafter, the logical product AND13 is simply referred to as AND13.) The above-described output of OST4 is inputted to the other input terminal of the AND13 (in this case, when the output of OST4 is H level the test lock 1 signal 46 becomes L level). The output signal of the AND13 is inputted to a fault latch circuit 412.

The test lock 1 signal 46 is at the L level for a predetermined time period indicated by T4 (timing t4 to t6) as described above, and the H level is outputted at other times. The matching between the test lock 1 signal 46 and the answer 1 signal 35*a* is monitored, and if they do not match, it is regarded as a failure state and is latched by the fault latch circuit 412.

(Monitoring the Matching Between Emergency Stop Command 2 Signal 34*a* and Answer 2 Signal 36*a*)

As described in FIG. 3, the emergency stop command 2 signal 34*a* is inputted to one terminal of AND2, and when the test lock 2 signal 34*a* is L level, the output signal of the AND2 becomes L level. Then the output signal of AND2 is inputted to the base of the transistor Tr1 via the AMP1, and the transistor Tr1 is turned off, and the photo device power supply to the photo device 212 is prohibited. As a result, the answer 2 signal 36*a*, which is the output of the voltage drop detection unit 213, becomes L level. Further, the answer 2 signal 36*a* is transmitted to the supervisory monitoring and control device 3 as a response signal to the emergency stop command 2 signal 34 via the interface unit 210.

In order to monitor whether the answer 2 signal 36*a* is responding as a response signal to the emergency stop command 2 signal 34, the emergency stop command 2 signal 34*a* is inputted to one terminal of an exclusive or EXOR12, and the answer 2 signal 36*a* is inputted to the other terminal of the exclusive or EXOR12 (Hereinafter, the exclusive or EXOR12 is simply referred to as EXOR12.).

The output signal of the EXOR12 is H level when the above two input signals do not match, and L level when they match. The output signal of the EXOR12 is inputted to one input terminal of the AND14, and the output signal (L level) of the AND14 is inputted to a fault latch circuit 413.

In this way, a signal for monitoring the matching between the emergency stop command 2 signal 34*a* and the answer 2 signal 36*a* is outputted from the output terminal of the AND14. As a result of the above monitoring, if they do not match, H level is outputted and it is regarded as a failure state and is latched by the fault latch circuit 413. In the case of matching, the L level is outputted, and the failure state is not latched by the fault latch circuit 413.

As described above, the test lock 2 signal 47 inputted to the other input terminal of the AND14 is outputted at the L level for a predetermined time period indicated by T5 (timing t4 to t8), and at other times the H level is outputted. Therefore, the matching between the emergency stop command 2 signal 34*a* and the answer 2 signal 36*a* is monitored during the time when the H level is being outputted, and if it does not match, it is regarded as a failure state and is latched by the fault latch circuit 413.

(Monitors the Matching Between the Test Lock 2 Signal 47 and the Answer 2 Signal 36*a*)

The test lock 2 signal 47 is inputted to one terminal of an exclusive or EXOR14, and the answer 2 signal 36*a* is inputted to the other terminal of the exclusive or EXOR14. The matching between the test lock 2 signal 47 and the answer 2 signal 36*a* is monitored (Hereinafter, the exclusive or EXOR14 is simply referred to as EXOR14.).

As a result of this monitoring, if the output signal of the EXOR14 does not match, the H level is outputted and is inputted to one input terminal of a logical product AND15 (Hereinafter, the logical product AND15 is simply referred to as AND15.). The above described OST5 output signal 53 is inputted to the other input terminal of the AND15. The output signal (L level) of AND15 is inputted to a fault latch circuit 414.

The test lock 2 signal 47 is at the L level for a predetermined time period indicated by T5 (timing t4 to t8) as described above, and the H level is outputted at other times. The matching between the test lock 2 signal 47 and the answer 2 signal 36*a* is monitored, and if they do not match with each other, it is regarded as a failure state and is latched by the fault latch circuit 414.

(Monitor that AND3 Output 45 is at L Level)

The AND3 output signal 45 shown in FIG. 3 becomes operable when the DEB/GB command signal 32*a*, the emergency stop command 1 signal 33*a*, and the emergency stop command 2 signal 34*a* all become H level, and the test lock 1 signal 46 is outputted from inversion INV11 shown in FIG. 4A (Hereinafter, the output signal of AND3 is simply referred to as AND3 output 45.).

As shown in FIG. 5A (*j*), the test lock 1 signal 46 is outputted at the L level for a predetermined time period indicated by T4 (timing t4 to t6) after the operation becomes possible. The test lock 1 signal 46 (L level) is inputted to one input terminal of AND1, and the answer signal 35a (L level) that is output of AND1 is inputted to one input terminal of AND3.

As a result, the AND3 output 45 is outputted at L level while the test lock 1 signal 46 is outputted (L level) (see FIG. 5 (*i*) and (*p*)).

The AND3 output signal 45 is in a state immediately before the PWM signal is outputted to the photo device 212, and it is important to confirm that this signal is at the L level. Because it can be monitored that the PWM signal is not outputted from the AND3 output terminal by this confirming.

In FIG. 4B, the test lock 1 signal 46 and the output of INV13, which are the outputs of INV11, are inputted to a logical sum OR11 (Hereinafter, the logical sum OR11 is simply referred to as OR11.). The output of the OR11 is inputted to one input terminal of the logical product AND16.

The AND3 output 45 is inputted to the other input terminal of the logical product AND16, and the output signal is inputted to the fault latch circuit 415. When the AND3 output 45 is H level or a pulse signal is outputted, and when the output of the OR11 is H level, the output of the logical product AND16 is also output as the H level or pulse shaped signal. Then is considered to be in a fault state, and is latched by a fault latch circuit 415.

(Monitors the Matching Between PWM Signal 44 and AND3 Output 45)

The PWM signal 44 outputted from the PWM signal generation circuit 215 is inputted to one input terminal of an exclusive or EXOR15, and the output signal 45 of the AND3 is inputted to the other input terminal of the exclusive or EXOR15, and the matching between the PWM signal 44 and the AND3 output 45 is monitored (Hereinafter, the exclusive or EXOR15 simply referred to as EXOR15.).

In this monitoring, for the timing to monitor the coincidence of the output signals, it needs (1) the OR1 output signal is at the H level, and (2) the output 35a of AND1 is at the H level, and the timing is after t6.

By this monitoring, it can be confirmed that the DEB/GB command signal 32a, the emergency stop command 1 signal 33a, the emergency stop command 2 signal 34a, and the test lock 1 signal 46 system are operating normally.

Therefore, the output of OR11 is inverted by inversion INV14, and the signal is used as one input of a logical product AND17 (hereinafter, the logical product AND17 is simply referred to as AND17). The output of the EXOR15 is connected to the other input of the AND17. A fault latch circuit 416 is connected to the output of the AND17.

As a result, when the output of OR11 is at L level, the coincidence between the PWM signal 44 and the AND3 output 45 is monitored, and when there is a mismatch, the output of the AND17 is at the H level or a pulse signal is outputted and the fault latch circuit 416 regards it as a fault condition and latches it.

(Monitoring that the PWM Signal is at L Level)

The PWM signal 44 is inputted to one input terminal of a logical product AND18. (Hereinafter, the logical product AND18 is simply referred to as AND18.) The test pulse generation command signal 48 is inputted to one input terminal of logical sum OR12 (Hereinafter, logical OR12 is simply referred to as OR12.).

The OND3 output signal 42 is inputted to the other input terminal of the OR12, and the output signal of the OR12 is inputted to an inversion INV15 (Hereinafter, the inversion INV15 is simply referred to as INV15.).

The output signal of INV15 is inputted to the other input terminal of the AND18. As a result, the test pulse generation command signal 48 becomes L level for a predetermined time period indicated by T5 (timing t4 to t5), and then becomes H level for a predetermined time period indicated by T7 (timing t5 to t7). The OR1 output signal 42 becomes L level from the timing t7 to a rear end of the OND3 output signal (timing t9), and the PWM signal 44 outputted from the PWM signal generation circuit 215 becomes L level. In this way, it can be monitored that the PWM signal is at the L level. If an H level or pulse is outputted as a result of this monitoring, it is regarded as a failure state and is latched by a fault latch circuit 417.

(Monitoring that the PWM Signal 44 is Pulse Shaped)

The test pulse generation command signal 48 and the on-delay 3 output signal 42 are inputted to the input terminal of the OR12, and the output signal of OR12 is inputted to one terminal of a logical product AND19 (Hereinafter, the logical product AND19 is simply referred to as AND19.).

As a result, one input terminal of the AND19 is maintained H level in a predetermined time period indicated by the test pulse generation command signal T7 (timing t5 to t7) and keeps L level in a predetermined time period indicated by T3 (timing t4 to t9) of the OND3 output signal, and then becomes H level after T3 has elapsed.

The PWM signal 44 is inputted to the retriggerable one-shot ROS. The retriggerable one-shot ROS generates and outputs a signal having a predetermined pulse width T10 using a rising signal as a trigger of a PWM signal 44 composed of a plurality of pulses. The predetermined pulse width T10 set here is set longer than the period of the carrier frequency of the PWM signal. With this setting, when the PWM signal 44 is outputting a normal PWM pulse, the output of the retriggerable one-shot ROS is continuously at H level.

The output signal of the retriggerable one-shot ROS is inputted to an inversion INV16, and the output signal of it is inputted to the other input terminal of AND19.

As a result, if the circuit is normal, the output of the retriggerable one-shot ROS circuit becomes H level during a predetermined H level time period indicated by the period T7 of the test pulse generation command signal and a H level period after the period T3 of the OND3 output signal.

In addition, during the period when the PWM signal 44 is not outputted, the output of the retriggerable one-shot OST is at H level. Therefore, by inverting the output of the retriggerable one-shot OST with the inversion INV16, the output of the inversion INV16 becomes L level when the PWM signal 44 is generated, and becomes H level when the PWM signal 44 is not generated. (FIG. 5A (*h*), FIG. 5A (*k*), FIG. 5B (*m*)). The output of the AND19 is connected to the fault latch circuit 418.

The output of the AND19 is a monitoring signal that the PWM signal 44 is pulse shaped. As a result of this monitoring, when the output of the AND19 is at H level, it is regarded as a failure state and is latched by the fault latch circuit 418.

While certain embodiment have been described, the embodiment has been presented by way of example only, and is not intended to limit the scope of the inventions. Indeed, the novel embodiment described herein may be embodied in a variety of other forms; furthermore, various omissions, substitutions and changes in the form of the embodiment described herein may be made without departing from the spirit of the inventions. The accompanying claims and their equivalents are intended to cover such forms or modifications as would fall within the scope and spirit of the inventions.

For example, it should be noted that a filter may be provided at the input of the fault latch circuits 411 to 418 if necessary in order to eliminate malfunction caused by a pulse-like abnormal signal due to a subtle signal delay or timing difference.

Also, some or all of the logic circuit, test signal generation circuit, and monitoring circuit shown in FIG. 3 may be realized by software.

As described above, a power conversion apparatus and a power conversion system that can ensure safety for emergency stop and have a failure monitoring function can be provided by performing followings. The command signal for stopping the power conversion apparatus is a dual system, and in the power conversion apparatus, test lock signal is outputted at a predetermined time after the operation command signal is outputted until the operation is started, and the answer signal of it is transmitted to the supervisory monitoring and control device, and monitor the matching between the test lock signal and the answer signal, and monitor the PWM signal is at the pulse state or at L level.

EXPLANATION OF SYMBOLS

100 Power conversion system
1 3-phase AC power supply
2 Drive apparatus
20 Main circuit
21 Control circuit
210 Interface unit
211 Optical communication cable
212 Photo device
213 Voltage drop detection unit
214 Test signal generation and monitoring unit
215 PWM signal generation circuit
3 Supervisory monitoring and control device
30a Control signal
30b response signal
31 Motor speed command signal
32 DEB/GB command signal
33 Emergency stop command 1 signal
34 Emergency stop command 2 signal
35 Answer 1 signal
36 Answer 2 signal
37a Emergency stop 1 abnormal
38a Emergency stop 2 abnormal
4 Motor
EXOR37, EXOR38 Exclusive or
OND1, OND2, OND3, OND6 On-delay
AND1, AND2, AND3, AND4, AND5, AND6 Logical product
AND11, AND12, AND13, AND14, AND15 Logical product
AND16, AND17, AND18 Logical product
AMP1 amplifier
Tr1 transistor
OR1, OR11, OR12 Logical sum
INV11, INV12, INV13, INV14, INV15, INV16 Inversion
EXOR11, EXOR12, EXOR13, EXOR14 Exclusive or
EXOR15 Exclusive or
OST4, OST5, OST7 One-shot
ROST Retriggerable one-shot

The invention claimed is:

1. A power conversion system configured to have a power conversion apparatus that receives power supply to drive a motor, and a supervisory monitoring and control device that is communicably connected to the power conversion apparatus, the supervisory monitoring and control device generates:
an operation command signal to be transmitted to the control circuit for operating/stopping the motor;
a first emergency stop command signal and a second emergency stop command signal transmitted to the power conversion apparatus to perform an emergency stop of the power conversion apparatus, the power conversion apparatus comprising:
a main circuit having a power conversion unit for supplying AC power to the motor;
a control circuit that transmits a PWM signal for driving on/off semiconductor elements that constitutes the power conversion unit of the main circuit, the control circuit includes:
a circuit for generating the PWM signal;
a gate pulse transmitting circuit for transmitting the PWM signal to the main circuit;
an emergency stop circuit for stopping transmission of the PWM signal to the main circuit when receiving either the first emergency stop command signal or the second emergency stop command signal;
a monitoring circuit for confirming the operation of the emergency stop circuit;
wherein, the control circuit generates the PWM signal delayed by a predetermined first delay period, in a state where neither the first emergency stop command signal nor the second emergency stop command signal is received from the supervisory monitoring and control device, and when an operation command signal is received from the supervisory monitoring and control device, a first test operation signal in the first delay period, the first test operation signal is a forced operation signal of the first emergency stop command signal, and generates a second test operation signal that is a forced operation signal of the second emergency stop command signal, in the first delay period.

2. A power conversion apparatus of a power conversion system configured to have a power conversion apparatus that receives power supply to drive a motor, and a supervisory monitoring and control device that is communicably connected to the power conversion apparatus, comprising:
a circuit for receiving an operation command signal transmitted from the supervisory monitoring and control device for operating and stopping the power converter;
a circuit for receiving a first emergency stop command signal and a second emergency stop command signal transmitted from the supervisory monitoring and control device to perform an emergency stop of the power conversion apparatus;
a main circuit having a power conversion unit for supplying AC power to the motor;
a control circuit that transmits a PWM signal for driving on/off semiconductor elements that constitutes the power conversion unit of the main circuit, the control circuit includes:
a circuit for generating the PWM signal;
a gate pulse transmitting circuit for transmitting the PWM signal to the main circuit;
an emergency stop circuit for stopping transmission of the PWM signal to the main circuit when receiving either the first emergency stop command signal or the second emergency stop command signal;

a monitoring circuit for confirming the operation of the emergency stop circuit;

wherein, the control circuit generates the PWM signal delayed by a predetermined first delay period, in a state where neither the first emergency stop command signal nor the second emergency stop command signal is received from the supervisory monitoring and control device, and when an operation command signal is received from the supervisory monitoring and control device, a first test operation signal that is a forced operation signal of the first emergency stop command signal, in the first delay period, and generates a second test operation signal that is a forced operation signal of the second emergency stop command signal, in the first delay period.

3. The power conversion apparatus of the power conversion system according to claim 2, wherein, the control circuit uses a photo device as part of the gate pulse transmitting circuit, cut off the signal transmitted from the circuit for generating the PWM signal to the photo device, when the first emergency stop command signal is received, and performs an emergency stop of the power conversion apparatus by shutting off power supply to the photo device when the second emergency stop command signal is received.

4. The power conversion apparatus of the power conversion system according to claim 3, wherein, the monitoring circuit includes:

a circuit for comparing a combined signal of the first emergency stop command signal and the first test operation signal, and an input signal of the photo device; and a circuit for comparing the combined signal of the second emergency stop command signal and the second test operation signal, and the output signal of the voltage monitoring device of the power supply terminal of the photo device.

5. The power conversion apparatus of the power conversion system according to claim 3, wherein, the control circuit further comprising:

a circuit for comparing the output signal of the circuit for generating the PWM signal with the input signal of the photo device, by generating a test signal for operating the circuit for generating the PWM signal, in the state where the second test operation signal is generated in the first delay period, and a checking circuit for monitoring the result of the comparison.

6. The power conversion apparatus of the power conversion system according to claim 3, wherein, the first delay period of the control circuit is shorter than a time period for detecting a mismatch between the first emergency stop signal of the supervisory monitoring and control device, and the response signal of the first emergency stop signal, and a time period for detecting a mismatch between the second emergency stop signal of the supervisory monitoring and control device, and the response signal of the second emergency stop signal.

* * * * *